Sept. 3, 1946.   H. H. HAMAN ET AL   2,406,830
METHOD OF SEALING TOGETHER TWO PIECES OF WATERPROOF
FABRIC, AND THE SEAM FORMED THEREBY
Filed June 9, 1944   2 Sheets-Sheet 2
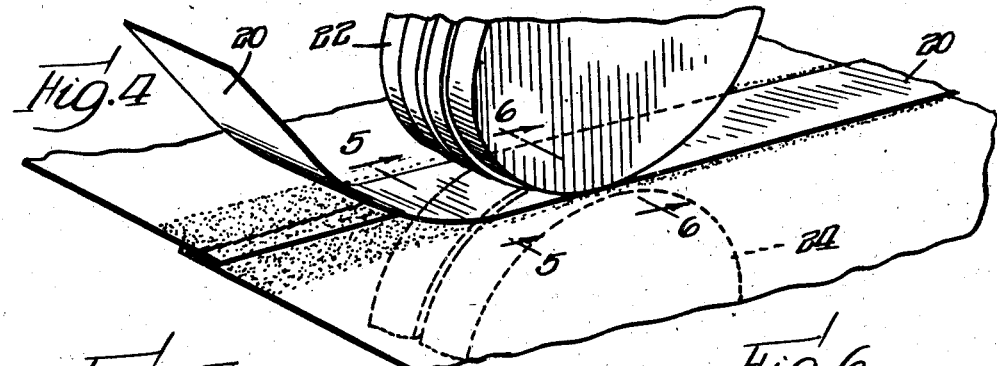
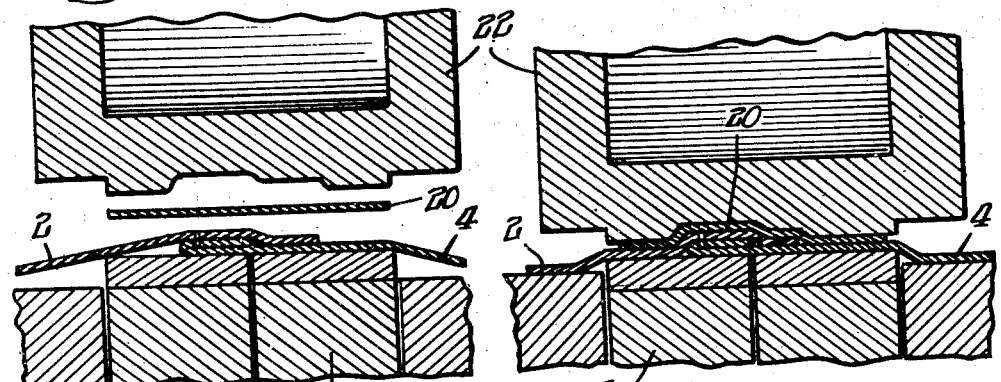
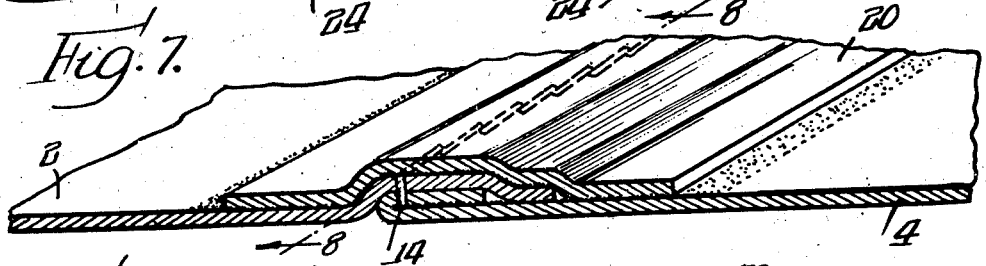
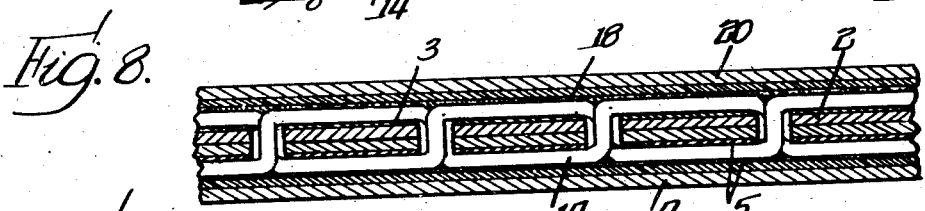
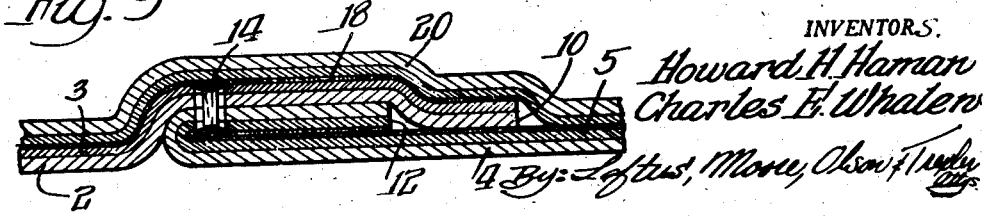
INVENTORS.
Howard H. Haman
Charles F. Whalen
By: Loftus, Moore, Olson & Trexler
attys.

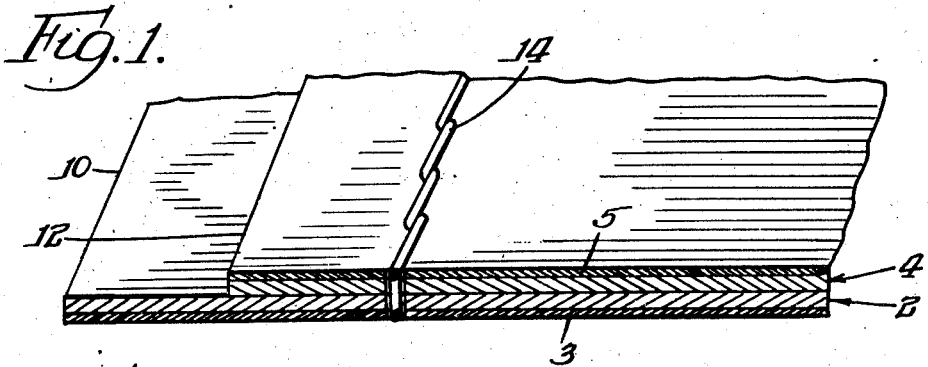
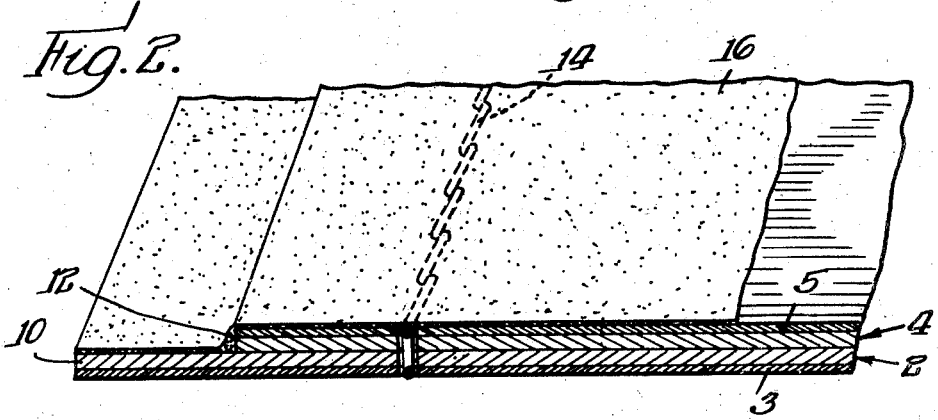
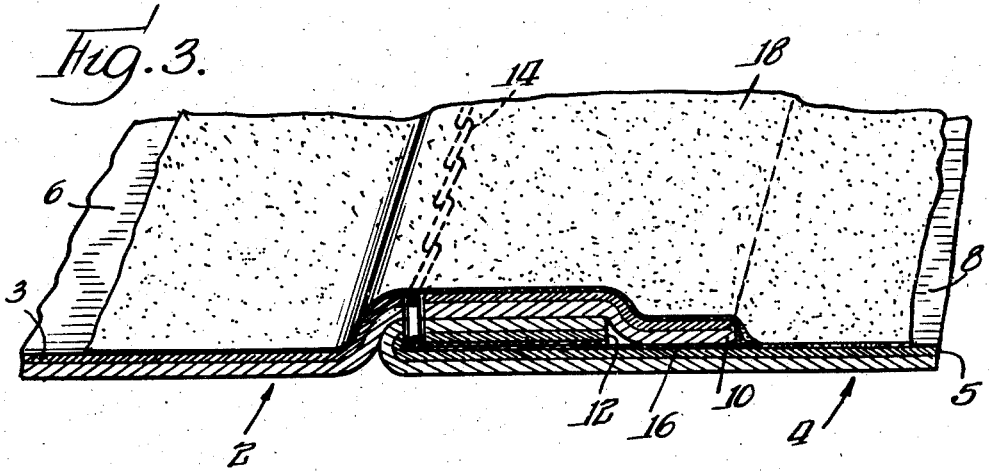

Patented Sept. 3, 1946

2,406,830

UNITED STATES PATENT OFFICE 2,406,830

METHOD OF SEALING TOGETHER TWO PIECES OF WATERPROOF FABRIC, AND THE SEAM FORMED THEREBY

Howard H. Haman and Charles E. Whalen, Three Oaks, Mich., assignors to The Warren Featherbone Co., Three Oaks, Mich., a corporation of Michigan Application June 9, 1944, Serial No. 539,456

2 Claims. (Cl. 154—42)

1

This invention relates to composite waterproof articles and to a method of making the same.

The present invention is particularly adapted to the manufacture of waterproof articles, such as raincoats, from waterproof fabrics, for example fabric coated with plasticized polyvinyl chloride, and among the objects of the present invention is to provide a strong, waterproof joint or seam between two of such waterproof pieces of fabric.

Yet another object of the invention resides in providing a stitched seam between two pieces of vinyl chloride resin coated fabric wherein the stitching is formed only through inner, interiorly disposed plies of the seam and not through the outermost layer of fabric, and wherein a vinyl chloride coated fabric tape, in association with vinyl chloride resin cement upon the vinyl chloride resin coated surfaces of the two pieces of fabric, is united with said pieces of fabric under heat and pressure in such a manner that the vinyl chloride resinous material flows before setting and plugs the stitched perforations and also forms a sealed, bonded seam or joint between the two pieces of fabric, whereby to provide a waterproof, strong seam or joint.

These and other objects have been attained by the use of our improved construction, as will be apparent from a perusal of the following specification when taken in connection with the accompanying drawings, wherein Figure 1 is a view of the first step in our improved process for uniting two sheets of waterproof fabric;

Figure 2 is the second step, showing the method of coating a part of the stitched joint with vinyl chloride resin cement;

Figure 3 is a view of the next step, illustrating the manner in which one of the fabrics is turned to position the seam inwardly of the outer face of the two fabrics, whereby to hide the perforations of the line of stitching;

Figure 4 is a view showing the manner in which the stitched together and cement coated fabrics are passed through means for heating and pressing the same together;

Figure 5 is a view of one form of pressing means, the parts being shown open;

Figure 6 is a similar view showing the tape being applied to the fabric surfaces;

Figure 7 is a view showing the vinyl chloride fabric tape positioned over the two stitched together fabrics;

Figure 8 is a view along line 8—8 of Figure 7; and

2

Figure 9 is an enlarged view of Figure 7.

Referring now more particularly to the drawings, each of the two fabrics to be seamed together includes a main body portion comprising a fabric coated with a synthetic polymeric waterproofing material, such as polyvinyl chloride or polyvinyl butyral. A particularly preferred waterproofing material is plasticized polyvinyl chloride sold under the trade name "Koroseal."

Referring to Figures 1 to 3, it will be seen that the seam formed and the process thereof comprises uniting two pieces of waterproof fabric 2 and 4 in the manner hereinafter described. The fabric piece 2 carries a coating on one face of polyvinyl waterproofing resin 3, and likewise the piece 4 has on its outer face a coating of polyvinyl waterproofing resin 5. These two fabric pieces 2 and 4 are placed with their polyvinyl coatings facing outwardly and with their marginal longitudinal edge portions 10 and 12 parallel and more or less in registration. In this position the overlapping portions are stitched together as at 14 by a line of stitching passing entirely through the two pieces of fabric 2 and 4. Either prior to the stitching or subsequently thereto, either one or both of the fabric pieces, such for instance as the fabric piece 4, is given a coating of polyvinyl waterproofing resin such as polyvinyl chloride or polyvinyl butyral or similar synthetic rubber cement 16 along the marginal edges thereof, the same being those portions of the fabrics which overlap and through which the line of stitching passes. This cement is allowed to dry. The fabric piece 2 is then shifted about the row of stitching 14 into the position shown in Figure 3, such that the two fabric pieces 2 and 4 lie substantially in a common plane with their polyvinyl resinous coatings facing in the same direction, preferably uppermost, and wherein the free edge 12 underlies the free edge 10 and one of the perforations formed by the stitching 14 lies wholly within the folded portion of the fabric 4 and terminates within the cement coating of this folded portion. The opposite end of the row of stitching 14 terminates at the cement coating 16 of the upper layer of fabric 2. In this position an additional coating of polyvinyl chloride or polyvinyl butyral cement 18 is applied to the upper surfaces 6 and 8 of the two fabric pieces along and on each side of the stitched seam 14. This cemented surface is to receive the tape hereinafter referred to and the coatings of cement are applied for the purpose of sealing the ends of the perforations formed by the stitching 14 and also to form a flowable, curable, bonding medium between the tape and the fabric portions 2 and 4.

The stitched together pieces shown in Figure 3 are then ready for the sealing strip or tape. A preferred tape comprises a fabric strip 20 which is heavily coated with preferably the same material with which the two fabric pieces 2 and 4 are coated. If desired, the fabric may be of a little lighter weight, but not necessarily so. This coated fabric tape is applied to the outside of the seam and is used as a reinforcement and a cover for the seam. The fabric coated tape is quite strong and tends to make the seam strong and durable. This tape may be a strip of Koroseal, for instance. It is understood that the tape is a fabric tape impregnated or coated with a polyvinyl chloride or a polyvinyl butyral, or may comprise a tape impregnated with any of the class of co-polymers formed in the butadiene and unsaturated nitriles having the structural formula

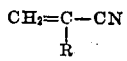

in which R is hydrogen or an alkyl group. This whole class of co-polymers is particularly suitable where fabric coated with Koroseal or the like is also employed. By way of further example, such co-polymers would include combinations of butadiene with methacrylic nitrile, ethacrylic nitrile, isopropyl-acrylic nitrile, etc., and preferred proportions are from about 10% to about 35% of the nitrile by weight based on the total weight of butadiene and the nitrile.

In short, it is preferred to make the tape of the same material of which the fabric is composed. This tape 20 is sufficiently wide to extend over all the stitches and to a substantial distance laterally thereof, whereby to overlie the cement coated portions 18 and 16 of the fabric pieces 2 and 4.

In order to bond or unite the tape to the two pieces of impregnated fabric, heat and pressure are employed. More particularly, the two stitched together fabric pieces with the overlying tape are pressed between platens having hard surfaces, the one platen being heated and the other being at room temperature, whereby more quickly to dissipate the heat. In the drawings the upper platen is shown as a relatively large heated roll 22, and the lower platen is shown as an unheated roll 24. The upper roll is heated electrically or by means of steam to a temperature of substantially 180° F. more or less, and the two rolls are pressed together by a spring or other means exerting a pressure of substantially thirty pounds per square inch. The rolls are positively driven so as to feed the tape and stitched together fabrics therethrough in a continuous manner under the heat and pressure, whereby the impregnating material in the tape and fabrics, together with the cement coating, is caused to flow under pressure and to become cured by the heat. The waterproofing material flows into the perforations formed by the stitching and plugs or seals these perforations and at the same time forms an intimate sealed bond between the tape and the two fabrics 2 and 4. This curing action is such that shortly after the sealed fabrics have come out from under the rollers they will permanently set and thus provide a very strong, bonded, sealed, waterproof joint wherein no stitching is present on the outside of the fabric and wherein the stitched seam is sealed by the flow of the waterproofing material into all portions of the seam, in which positions it is cured, and thus prevents the passage of moisture through the seam.

In certain instances it is proposed to use pressing plates or platens of modified form, and the temperature conditions and pressure conditions may be varied to suit the type of impregnated fabrics to be united.

In certain instances the stitched seam may be formed by overlapping two waterproofed fabrics, either coated or impregnated with the resinous material, applying an impregnated or coated tape to the overlapping joint, and uniting the tape thereto under heat and pressure conditions to cure the same in the manner hereinbefore set forth.

While we prefer to employ the line of stitching as illustrated for providing a seam which shall be strong and waterproofed, it is to be understood that the stitching is not necessary from the standpoint of making a tight waterproofed joint by the use of the remaining steps of the procedure as above outlined.

Other types of seams between the fabric pieces and the opposed tapes, or a single tape, are within the contemplation of this invention.

No claim is made to the mechanism per se, as that forms the subject matter of separate applications.

Obviously the invention is not limited to the specific details of construction disclosed herein but is capable of other modifications and changes without departing from the spirit and scope of the appended claims.

Having thus described our invention, what is claimed as new and desired to be secured by Letters Patent is:

1. A method of forming a seam in waterproof fabric including the steps of superposing one piece of fabric having a marginal edge on another piece of fabric having a marginal edge with the marginal edge of the upper fabric piece spaced inwardly from the marginal edge of the lower fabric piece with the edges in substantially parallel relation, stitching said pieces of fabric together along a line substantially parallel to but spaced inwardly from the marginal edge of the uppermost piece of fabric, covering the area including the line of stitching and the marginal edge of the upper piece of fabric with waterproof material whereby to seal the line of stitching and the upper marginal edge to the upper surface of the lower piece of fabric, swinging the lower piece of fabric approximately 180 degrees around the line of stitching and swinging the marginal edges substantially 180 degrees around the line of stitching to bring the bottom surface of the lower piece of fabric substantially into a plane with the upper surface of the upper piece of fabric with the tab of the lower piece of fabric extending from the stitching to its marginal edge overlapping and extending beyond the marginal edge of the upper piece of fabric, then covering the area including the upper surface of the upper piece of fabric and the lower surface of the lower piece of fabric adjacent the juncture of the marginal edge of the lower piece of fabric and the line of stitching with waterproof material.

2. A seam for joining two pieces of waterproof fabric including a first piece of fabric having a marginal edge, a second piece of fabric having a marginal edge positioned inwardly but substantially parallel to the marginal edge of the first piece of fabric, said pieces of fabric being stitched together along a line spaced inwardly from but parallel to said marginal edges to form a short tab and a long tab between the line of stitching and the respective marginal edges, waterproof material sealing the line of stitching and the juncture between the marginal edge of the short tab and the surface of the long tab adjacent thereto, both said tabs being folded around said line of stitching whereby the long tab covers the line of stitching and the short tab and a waterproof sealing tape positioned over the exposed line of stitching and the juncture of the marginal edge of the long tab with the surface of the fabric piece it overlies.

HOWARD H. HAMAN.
CHARLES E. WHALEN.